Figure 1:
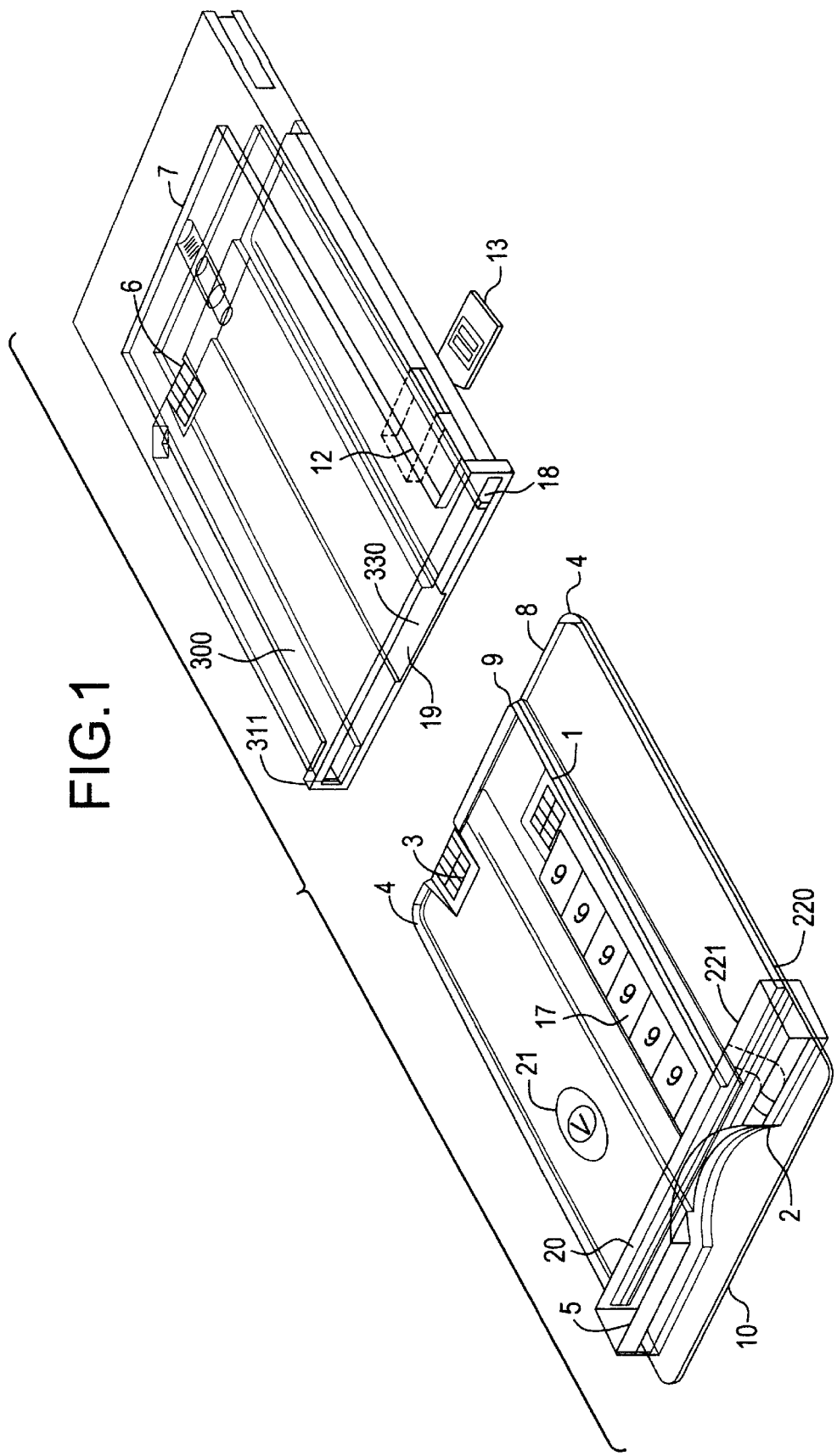

United States Patent
Neifer et al.

[11] Patent Number: 6,145,748
[45] Date of Patent: Nov. 14, 2000

[54] CHIP CARD READER HAVING A DUAL READING MODULES

[75] Inventors: Wolfgang Neifer, Freising; Robert Schneider, Pfaffenhofen, both of Germany

[73] Assignee: SCM Microsystems GmbH, Germany

[21] Appl. No.: 09/147,552

[22] PCT Filed: Jul. 21, 1997

[86] PCT No.: PCT/EP97/03912

§ 371 Date: Jan. 19, 1999

§ 102(e) Date: Jan. 19, 1999

[87] PCT Pub. No.: WO98/03931

PCT Pub. Date: Jan. 29, 1998

[30] Foreign Application Priority Data

Jul. 20, 1996 [DE] Germany .............. 196 29 351

[51] Int. Cl.[7] ................................................. G06K 7/00
[52] U.S. Cl. .................. 235/486; 235/492; 235/451; 361/737; 361/752
[58] Field of Search .................... 235/492, 486, 235/495, 482, 451; 361/737, 752

[56] References Cited

U.S. PATENT DOCUMENTS

| | | | |
|---|---|---|---|
| 4,975,805 | 12/1990 | Schmutzler | 361/399 |
| 5,049,728 | 9/1991 | Rovin | 235/492 |
| 5,315,478 | 5/1994 | Cadwell et al. | 361/684 |
| 5,430,617 | 7/1995 | Hsu | 361/818 |
| 5,526,233 | 6/1996 | Hayakawa | 235/488 X |
| 5,563,400 | 10/1996 | Le Roux | 235/486 |
| 5,625,534 | 4/1997 | Okaya et al. | 361/686 |
| 5,663,553 | 9/1997 | Aucsmith | 235/492 |
| 5,673,180 | 9/1997 | Pernet | 361/756 |

FOREIGN PATENT DOCUMENTS

| | | |
|---|---|---|
| 0 282 954 | 3/1988 | European Pat. Off. . |
| 0 549 983 | 12/1992 | European Pat. Off. . |
| 0704820 A1 | 9/1995 | European Pat. Off. . |
| 295 05 678 U | 4/1995 | Germany . |

*Primary Examiner*—Michael G Lee
*Attorney, Agent, or Firm*—Nixon Peabody LLP; Stuart J. Friedman

[57] ABSTRACT

In a mobile chip card reading module (20) with a channel (5) for accommodating a chip card (10) in which is arranged a reading head for reading the chip card (10), a front area (230), a rear area (220) which is shorter than the front area (230), a vertical pressing spring (2) arranged in the rear area (220), by which the chip card (10) when inserted into the reading module (20) is pressed towards a side wall of the channel (5), and by which the position of the inserted chip card (10) is fixed within the reading module (20), it has been made possible to make the chip card reading module even smaller and lighter in that the front area (230) of the chip card reading module (20) can be inserted into the accommodation channel (330) of a sleeve (300), which in its rear area (310), which is provided with a guide for the insertion of the chip card, has a collar (311) which fits snugly against the front edge of the rear area (220) of the chip card reading module, that the collar (311) in the inserted state of the chip card reading module forms with the rear area (220) thereof a unit whose height and width are each greater than those of the accommodation port of the computer, and the front area (230) of the sleeve (300) can be inserted into an accommodation port of the computer, the height and the width of this front area (230) being made sufficiently smaller than those of the accommodation port, so that it can be inserted to fit snugly into the accommodation port of the computer.

20 Claims, 2 Drawing Sheets

CHIP CARD READER HAVING A DUAL READING MODULES

The invention relates to a chip card reader which consists of a mobile reading module and a sleeve which can be inserted into an accommodation slot of a computer and into which the reading module can be inserted.

Chip card reading modules are known from the prior, not pre-published, DE 196 04 031.0-53. They are used as interfaces between a computer and a chip card and can be inserted into a corresponding accommodation slot of a computer. Therefore, by the use of such reading modules a direct data transfer from a computer to a chip card and/or from a chip card to a computer is made possible.

Chip cards can store data for a variety of purposes, such as for making telephone calls, for control applications, account keeping, security checks, etc. The chip cards normally have the usual credit card format and can be read by chip card readers of different types. In this context, separate chip card readers are also known which are connected to a computer in order to transfer data from the chip card to the computer. Such separately arranged devices, however, require a connecting cable and a connecting plug and are unwieldy because of their size, and are susceptible to interference on account of their unprotected plug and socket connectors.

The chip card reading module known from DE 196 04 031.0-53 solves the problem of providing a small and handy interface between a chip card and a computer in which the reliability of the data transfer with the computer is increased.

The object of the present invention is to make the chip card reading module even smaller and lighter.

In accordance with the invention, this object is achieved by a division of the reader into a mobile reading module and a sleeve into which the reading module can be inserted and which can remain inserted in the accommodation slot of the computer.

Preferred embodiments of the invention are the subject of the sub-claims.

In the chip card reading module in accordance with the invention it is thus made possible to divide the chip card reading module known from DE 196 04 031.0-53 into two units, the chip card reading module in accordance with the invention constituting the first unit and the sleeve of the chip card reading module in accordance with the invention constituting the second unit. The second unit is embodied in such a way that it can remain permanently inserted in the accommodation port of a computer. Because of this it becomes possible to make the chip card reading module in accordance with the invention, which as such is not inserted directly into the computer, but into the second unit, even smaller and lighter than in the prior art.

The chip card reading module in accordance with the invention enables new services and processes to be performed by means of a particularly light and space-saving chip card module, in particular data transmission, such as electronic cash transfer, access security, transfer of medical data, or the transfer of computer files from a computer to a chip card or vice versa. Furthermore, the chip card reading module in accordance with the invention in the form of preferred embodiments offers the advantage that it can be used both as a contacting chip card reading module (ICC, integrated circuit card) and as a contactless chip card reading module (CICC, contactless integrated circuit card).

According to a preferred embodiment of the chip card reading module in accordance with the invention, at the end of the front area of the channel for accommodating the chip card, two lugs, triangular in cross-section, are arranged, the inward pointing surfaces of each of which come to abut against the rounded corner sides of the inserted chip card. By means of these lugs a lateral fixing of the chip card in the channel accommodating the chip card is achieved, so that the chip card, when abutting against these lugs, remains immovable within the channel accommodating the chip card.

In accordance with an important embodiment of the chip card reading module according to the invention, the sleeve forming the counterpart of the chip card reading module has a latch-in/ejection device at the end of the accommodation channel opposite the collar. By means of this device, latching of an inserted chip card reading module in the sleeve is achieved in the desired position, in which the collar of the sleeve forms a unit with the rear area of the chip card reading module whose height and width are each greater than those of the accommodation port of the computer. This device furthermore ensures that a pressure exerted from outside on the inserted chip card reading module in the direction of the accommodation channel of the sleeve causes the ejection of the chip card reading module from the sleeve.

In the chip card reading module in accordance with the invention provision is basically made for a battery-powered CPU connected to a reading head contacting the chip of the chip card. This CPU can, according to a preferred embodiment, for the purpose of interrogation of data stored on the chip card, be connected to a display which may be controlled by a switch or a shift button. It is thereby possible for the owner of the chip card reading module to retrieve specific data stored in the chip at any time without having recourse to other means.

The chip card has on one of its surfaces a module contact surface which is connected to the CPU and which on insertion into the accommodation channel of the sleeve, makes contact with a corresponding sleeve contact surface of an inner surface of the accommodation channel. Here, the CPU serves as a change-over device to supply electrical data signals from the contact surface of the chip to the module contact surface of the chip card reading module. This ensures that in order to establish an electrical contact for the purpose of transferring data signals from the chip card reading module to the sleeve, as well as in the opposite direction, the corresponding contact surfaces of both the module and the sleeve are used at any time. In order to keep wear to a minimum, the module contact surface and the sleeve contact surface, in accordance with preferred embodiments, are made larger and/or more robust than the contact surfaces of the chip.

To ensure the establishment of a positive and at the same time smooth contact between the module contact surface and the sleeve contact surface, the module contact surface and the sleeve contact surface are arranged at an equal acute angle to a surface of the chip card reading module, or to one of the inner surfaces of the sleeve.

In order to ensure that the module contact surface in the inserted state of the chip card reading module always makes contact with the sleeve contact surface, at least one surface of the chip card reading module is divided into at least two areas of different height, which are opposed by corresponding different heights of the accommodation channel of the sleeve. By virtue of this break in symmetry it is ensured that the chip card reading module can only be inserted into the sleeve in one specific orientation (sunny-side up).

According to a further preferred embodiment of the chip card reading module in accordance with the invention, the sleeve is provided with a receiving area for an identification module or an access module (SIM/SAM). In such an identification module cryptographic data can be stored which ensure that a transfer of data signals from the chip card reading module to the sleeve and in the reverse direction can only proceed after the successful identification of a person by supplying a corresponding identification signal or identification code. The identification module can be made to operate in such a way that it executes a frequency analysis of words entered via a microphone by the person concerned and by means of pattern recognition procedures can identify specific individuals within a previously determined group of people, or it can be designed in a way that it will allow the data transfer to the chip card reading module in response to a specific number combination input by means of an input field which is not shown here. In place of an identification module, as an alternative, an ROS module (Record On Silicon module) can be inserted into this receiving area and so coupled to the chip card reading module via the sleeve. Such modules with at least one chip offer a very great storage capacity and are used in particular for storing software or image data (photo, video).

The chip card reading module according to the invention, as well as the sleeve, can be provided with an antenna for the purpose of communication and/or data transfer with another device or another computer. It is hereby assumed that an appropriate further antenna is provided at the other device or the other computer, and that both devices are provided with facilities for the modulation and demodulation of electromagnetic waves of a suitable frequency. By means of a corresponding, preferably coded, signal transfer procedure it becomes possible that the chip card reading module and the sleeve for the purpose of communication with another computer, need not be brought into direct physical contact with it, but that a corresponding signal transfer can also be accomplished when the chip card reading module or the sleeve is placed in the proximity, usually within the range of a few metres, of the computer or the other device. In the case of account keeping it becomes then possible to realise a specific operation regarding an account kept on the chip card by simply passing by a till point equipped with a corresponding computer. Such an embodiment, furthermore, offers the advantage that the energy required for a data transfer to or from the chip card can be provided in the form of electro-magnetic waves of a suitable frequency by a corresponding device fitted with an antenna, so that there is in this case no need for the chip card to incorporate an internal power source. Instead of an antenna, a device for capacitive or inductive coupling may equally well be provided.

Also for the purpose of communication and/or data transfer with another device or with another computer, the chip card reading module according to the invention, or the sleeve, can be equipped with an infrared transmitter/receiver. In analogue fashion to the use of an antenna, this allows data signals to be interchanged within a pre-determined distance between the chip card and a computer by means of modulated light signals, without the necessity of bringing either the chip card reading module or the sleeve into direct contact with the computer.

In the following, the invention is explained with reference to two advantageous embodiments which are illustrated in the drawing in which.

FIG. 1 provides a top view of the chip card reading module in accordance with the invention and of the corresponding sleeve, where non-visible areas are shown in dashed lines, in accordance with a first embodiment; and accommodation.

Figure 2:
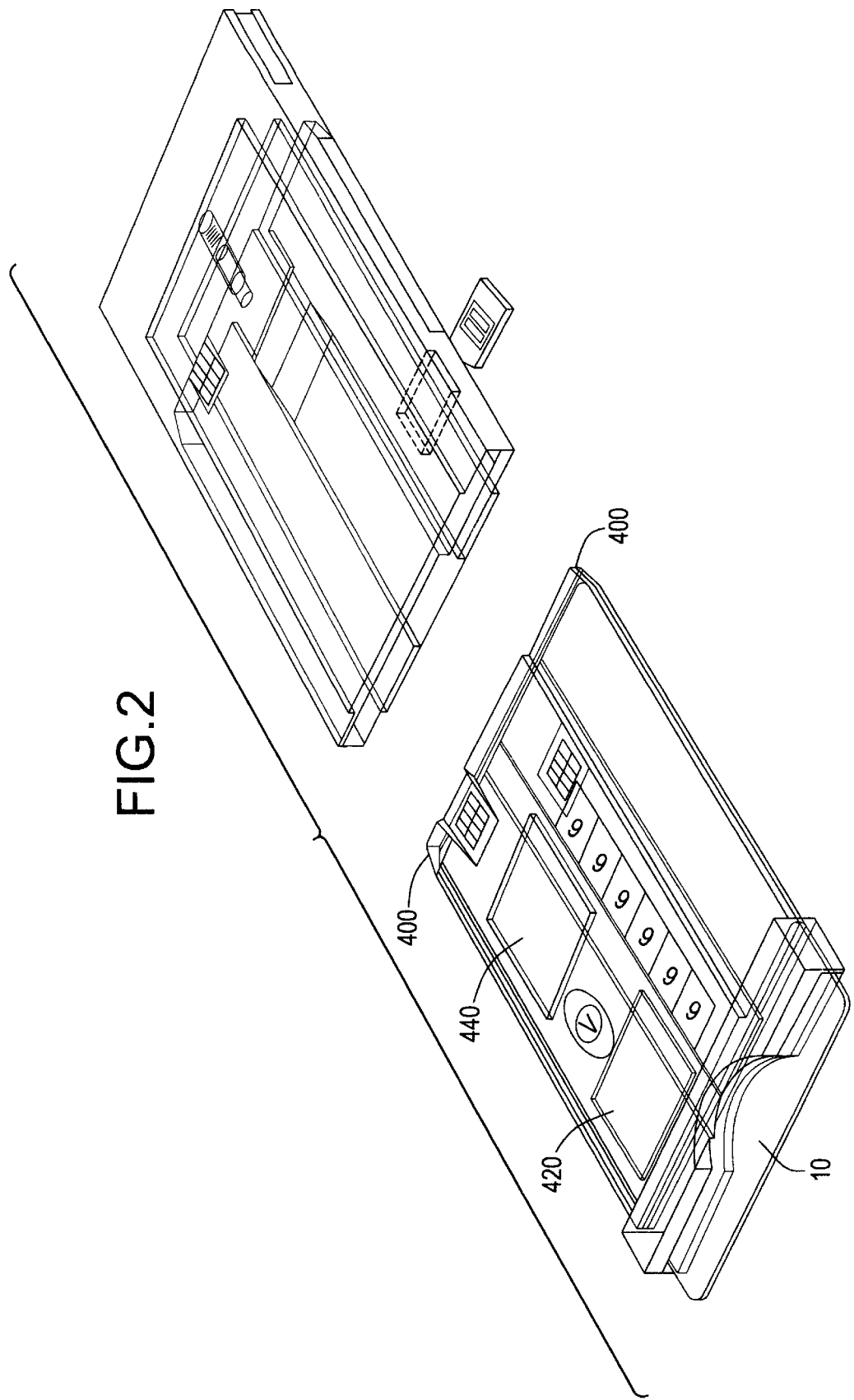

FIG. 2 gives an analogous view of a second embodiment.

The chip card reading module 20 in accordance with the invention represented in FIG. 1 has a channel 5 to accommodate a chip card 10, into which the chip card 10 is inserted until it is fixed in position in it by triangular lugs 4 of the chip card reading module. The chip card reading module has a reading head, not shown, for reading the chip 1 of the chip card 10. By means of an internal CPU, not shown here, data signals read by the reading head from the chip 1 are applied to a module contact surface 3, which is at an acute angle to the surface of the chip card reading module. The chip card reading module has a pressing spring 2 which in the inserted state of the chip card in the chip card reading module interacts with the triangular lugs and ensures the stable positioning of the chip 1 below the not-represented reading head. The chip card reading module has a rear area 220 with a front edge 221. Furthermore, the upper surface of the chip card reading module is divided into two areas 8, 9 of different height.

The chip card reading module in accordance with the invention is so designed that it can be inserted in its entirety into a sleeve 300, and all of this sleeve, with the exception of a collar 311, can be inserted into an accommodation port of a computer and, for this purpose, is provided with corresponding contact means at the front lateral surfaces. When the chip card reading module 20 is inserted into a corresponding accommodation channel 330 of the sleeve, then the collar 311 of the sleeve 300 abuts against the front edge 221 of the rear area 220 of the chip card reading module 20. The formation of different heights 18, 19 in the accommodation channel 330 of the sleeve 300, which correspond to the different heights of the two areas 8, 9 of the chip card reading module, results in that the chip card reading module can be inserted into the accommodation channel 330 in only one pre-determined orientation. When the chip card reading module is inserted into the accommodation channel 330 of the sleeve, the module contact surface 3 comes to lie below the sleeve contact surface 6, both contact surfaces assuming a state of positive electrical contact between each other. At the end of the accommodation channel 330 opposing the collar 311, the sleeve 300 has a latch-in/ejection device 7 by which the chip card reading module 20, when inserted, is firmly latched into the sleeve 300, and by means of which, when renewed pressure is exerted on the chip card reading device in the direction of insertion into the sleeve 300, the ejection of the chip card reading module 20 is effected.

The sleeve 300 has a receiving area 12 for an identification module 13 which only on inputting a pre-determined code allows a data transfer from the chip card reading module to the sleeve, as well as in the reverse direction. In this manner, any misuse of the chip card reading module by persons not knowing the special code of the identification module is prevented. The integrated CPU, not shown in the chip card reading module, is supplied with power by a battery, also not shown. The CPU is connected to a display 17 which can be controlled by a shift button 21. By repeatedly pressing the shift button 21, different data stored on the chip card 10 are indicated on the display 17 in a pre-determined sequence.

For the purpose of data transfer with another device or with another computer, respectively, the sleeve 300 is provided internally with an integrated antenna, not shown here, which is fed by a transmitting and receiving unit, also not shown here, integrated in the sleeve 300 and which is supplied with power by a battery, also not shown. This transmitting unit transmits the data stored on a storage chip, also not shown, which is integrated in the sleeve 300, to another computer, also provided with an antenna. The transmitting and receiving unit is for this purpose connected electrically with the storage chip, not shown here, by means of suitable electrical interfaces and transformer devices.

When the sleeve 300 is inserted into the accommodation port of a computer, with a direct electrical contact being established via corresponding contact means, the antenna is not activated. In this case, the data signals stored on the not-depicted storage chip in the sleeve 300 are directly transferred to the computer. In this manner a data transfer is achieved of data which are stored on the chip 1 of the chip card 10 via the CPU of the chip card reading device in the direction of insertion into the sleeve 300 where the ejection of the chip card reading module 20 is effected.

When the sleeve 300 is inserted into the accommodation port of a computer, with a direct electrical contact being established via corresponding contact means, the antenna is not activated. In this case, the data signals stored on the not-depicted storage chip in the sleeve 300 are directly transferred to the computer. In this manner a data transfer is achieved of data which are stored on the chip 1 of the chip card 10 via the CPU of the chip card reading module and the module contact surface 3, the sleeve contact surface 6, the non-depicted storage chip in the sleeve 300 and the electrical contact means at the sleeve 300 and at the computer, to the computer and in the reverse direction.

The embodiment represented in FIG. 2 is very similar to that of FIG. 1; the collar 311 could, however, be dispensed with since the narrow side surfaces of the sleeve 300 are closed by thin metal laminae and therefore constitute a guide for the reading module. The sleeve 300, when inserted into the accommodation slot of a computer, does not protrude from it, or only by a very small amount. The insertion of the reading module into the sleeve 300 is facilitated in that bevelled chamfers 400 are arranged at the front end of the reading module.

The reading module, in turn, constitutes a protective sleeve for a chip card 10 inserted into it. This protective sleeve, on the one hand, is flexible so that the entire reading module with the inserted chip card can be easily transported in a pocket of a garment. On the other hand, this sleeve is reinforced in the area of the contacts of the chip card, in order to protect the chip card in its most vulnerable area.

As long as the reading module is not inserted into the sleeve 300, the chip card 10 preferably remains within the accommodation channel of the reading module in a position at which a small distance remains between the contacts of the chip card and the reading head of the reading module. After having inserted the reading module into the sleeve 300, or force-guided by the process of insertion into the sleeve 300, the chip card is pressed with its contacts against the reading head inside the accommodation channel of the reading module.

Both embodiments have further particularities in common. In particular, the reading module can have further facilities apart from the display 17. In the case of the preferred embodiment, it is provided with a foil battery 420 which enables the autonomous operation of the reading module. The foil battery 420, after insertion of the reading module into the sleeve 300, is charged via the electric contacts of the sleeve from the power supply of the computer. Furthermore, the reading module is provided with a flat optical scanning element 440 which is accessible at the surface of the reading module. Such a scanning element, in conjunction with an electronic evaluation facility, can be used for the identification of a finger print.

In the case of both embodiments, measures can be provided for in order to releasably lock the reading module inside the sleeve 300, once it has been inserted into it.

What is claimed is:

1. Chip card reader with a first, mobile reading module (20) having a channel (5) for accommodating a chip card (10) in which is arranged a reading head for reading the chip card (10), characterized in that the first reading module (20) has a front area and a rear area (220) which is shorter than the front area, and that the reader comprises a second module in a form of a sleeve (300) having a second module front area and an accommodation channel (330) into which the front area of the first reading module (20) can be inserted, the second module front area of the sleeve (300) being able to be inserted into an accommodation slot of a computer, and height and width of said second module front area being designed sufficiently smaller than those of the accommodation slot so that the second module front area can be inserted snugly into the accommodation slot of the computer, the sleeve furthermore having at its front end a contact strip for connection to a corresponding contact strip in the accommodation slot of the computer, and the sleeve having contacts for connection with corresponding contacts of the first reading module.

2. Reader according to claim 1, characterized in that at end of the first module front area of the channel (5) for accommodating the chip card, for purpose of lateral fixing of the chip card (10) two lugs (4), triangular in cross-section, are arranged, inward pointing surfaces of each of which come to abut against rounded corner sides of the inserted chip card.

3. Reader according to either claims 1 or 2, characterized in that the sleeve (300) at an end of the accommodation channel (330) opposite a collar (311) has a latch-in/ejection device (7) for latching-in and ejecting the chip card reading module inserted into it.

4. Reader according to claims 1 or 2, characterized in that on the first module a battery-powered CPU connected to a reading head contacting the chip (1) for reading the chip card is provided in the chip card reading module (20).

5. Reader according to claims 1 or 2, characterized in that for purpose of interrogation of data stored on the chip card (10) a CPU is connected to a display (17) which can be controlled by either a switch or a shift button (21).

6. Reader according to claims 1 or 2, characterized in that the chip card (10) on one of its surfaces has a module contact surface (3) which is connected to a CPU and which on insertion into the accommodation channel (330) of the sleeve (300), makes contact with a corresponding sleeve contact surface (6) at an inner surface of the accommodation channel (330).

7. Reader according to claims 1 or 2, characterized in that contact surfaces are made larger and/or more robust than the contact surfaces of the chip (1).

8. Reader according to claims 1 or 2, characterized in that contact surfaces are arranged at an acute angle with respect to a surface of the chip card reading module (20), or to one of the inner surfaces of the sleeve (300).

9. Reader according to claims 1 or 2, characterized in that at least one surface of the chip card reading module is divided into at least two areas (8, 9) of different height, which are opposed by corresponding different heights (18, 19) in the accommodation channel (330) of the sleeve (300).

10. Reader according to claims 1 or 2, characterized in that the sleeve (300) is provided with a receiving area (12) for an identification module or an access module (SIM/SAM) (13).

11. Reader according to claims 1 or 2, characterized in that the sleeve (300), for purpose of communication or data transfer with another device or another computer is equipped with an antenna.

12. Reader according to claims 1 or 2, characterized in that the sleeve (300), for purpose of communication or data transfer with another device or another computer is equipped with an infrared transmitter/receiver.

13. Reader according to claims 1 or 2, characterized in that the chip card reading module (20), for purpose of communication or data transfer with another device or another computer is equipped with an antenna.

14. Reader according to claims 1 or 2, characterized in that the chip card reading module (20), for purpose of communication or data transfer with another device or another computer is equipped with an infrared transmitter/receiver.

15. Reader according to claims 1 or 2, characterized in that the first reading module forms a flexible protective cover for the chip card, which is reinforced in an area of the contacts on the chip card.

16. Reader according to claim 15, characterized in that the chip card in the channel of the second reading module can be held in a position where its contacts are kept at a distance from an reading head.

17. Reader according to claim 16, characterized in that when the second reading module is inserted into the sleeve (300), the chip card is moved to abut with its contacts against the reading head.

18. Reader according to claims 1 or 2, characterized in that the first reading module is provided with an optical scanning element which is accessible at its surface.

19. Reader according to claims 1 or 2, characterized in that the first reading module is provided with an autonomous power supply in the form of a foil battery.

20. Reader according to claim 19, characterized in that the foil battery after insertion of the first reading module into the sleeve can be recharged via its contacts from the power supply of the computer.

* * * * *